United States Patent [19]

Flanagan et al.

[11] Patent Number: 4,942,195

[45] Date of Patent: Jul. 17, 1990

[54] TOUGHENED RUBBER BASED HOT MELT ADHESIVE COMPOSITIONS FOR BOOKBINDING APPLICATIONS

[75] Inventors: Thomas P. Flanagan, Green Brook; Paul Puletti, Glen Gardner, both of N.J.

[73] Assignee: National Starch and Chemical Investment Holding Corporation, Wilmington, Del.

[21] Appl. No.: 233,171

[22] Filed: Aug. 17, 1988

[51] Int. Cl.$^5$ ............................................. C08J 23/00
[52] U.S. Cl. ................... 524/294; 156/334; 156/908; 281/21.1; 524/343; 412/2; 412/5; 412/8
[58] Field of Search ............... 524/343, 294; 156/334, 156/908; 412/2, 5, 8, 90; 281/21 R

[56] References Cited

U.S. PATENT DOCUMENTS

| | | | |
|---|---|---|---|
| 3,239,478 | 3/1966 | Harlan | 260/27 |
| 3,573,240 | 3/1971 | Flanagan | 260/23 |
| 3,615,106 | 10/1971 | Flanagan et al. | 281/21 |
| 3,837,994 | 9/1974 | Flanagan et al. | 161/100 |
| 3,964,769 | 6/1976 | Shatzkin | 281/21 R |
| 4,019,758 | 4/1977 | Heller et al. | 281/21 R |
| 4,091,487 | 5/1978 | Axelrod | 281/21 R |
| 4,136,699 | 1/1979 | Collins et al. | 128/290 R |
| 4,184,218 | 1/1980 | Hawkes | 11/1 AD |
| 4,187,572 | 2/1980 | Savich | 11/2 |
| 4,248,657 | 2/1981 | Henry | 156/443 |
| 4,345,349 | 8/1982 | Flanagan | 412/5 |
| 4,374,441 | 2/1983 | Carter et al. | 412/3 |
| 4,405,156 | 9/1983 | Carter et al. | 281/29 |
| 4,411,954 | 10/1983 | Butch et al. | 428/343 |
| 4,420,282 | 12/1983 | Axelrod | 412/4 |
| 4,526,577 | 7/1985 | Schmidt et al. | 604/366 |
| 4,536,012 | 8/1985 | Hume | 281/21 R |
| 4,578,302 | 3/1986 | Schmidt et al. | 428/110 |
| 4,660,858 | 4/1987 | Flanagan | 281/21 R |
| 4,704,110 | 11/1987 | Raykovitz et al. | 604/366 |
| 4,712,808 | 12/1987 | Beh-Forrest et al. | 281/15 R |
| 4,722,650 | 2/1988 | Allen et al. | 412/3 |

OTHER PUBLICATIONS

Blair, W. E. et al., "Good Tack and Open Time Help Glue Hold Market Share", Adhesives Age, Jun. 1987.
Klinefelter, L. M., "Bookbinding Made Easy", The Bruce Publishing Company, Milwaukee, pp. 39–41.
Leitner, N. B., "A New Look at Animal Glue for Casemaking", H. B. Fuller Company.
Mielke, G. P., "Book Cover Warping", 8 pages.

*Primary Examiner*—Edith Buffalow
*Attorney, Agent, or Firm*—Ellen T. Dec; Edwin M. Szala

[57] ABSTRACT

Thus, the present invention is directed to hot melt adhesive compositions suitable for bookbinding application comprising tackifying resins, at least one wax diluent and a substantially radial styrene-butadiene block copolymer, the copolymer having a styrene content greater than about 35% by weight, a modulus at 300% elongation of at least 4.5 MPa and a solution viscosity less than about 1000 cps.

10 Claims, No Drawings

TOUGHENED RUBBER BASED HOT MELT ADHESIVE COMPOSITIONS FOR BOOKBINDING APPLICATIONS

Various block and multi-block thermoplastic rubbery copolymers comprising domains of polystyrene endblocks and rubbery butadiene midblocks are available. Depending on their specific physical characteristics, the various copolymers have been suggested for different end uses including some grades which are recommended for use in moldings or extrusions (e.g. footwear, automotive, hose, etc.) while other grades are recommended as adhesives, coatings or sealants.

We have now found that the use, in bookbinding hot melt adhesive compositions, of a specific class of block copolymers normally recommended for the footwear industry provides adhesive compositions with a superior range of properties not heretofore achievable with conventionally employed adhesive grade block copolymers.

Thus, the present invention is directed to hot melt adhesive compositions suitable for bookbinding applications comprising tackifying resins, at least one wax diluent, a stabilizer and a substantially radial styrene-butadiene block copolymer, the copolymer having a styrene content greater than about 35% by weight, a modulus at 300% elongation of at least 4.5 MPa and a solution viscosity less than about 1000 cps.

The resultant toughened hot melt adhesives of the invention are excellent in the bookbinding field where, due in part to the lower viscosity of the copolymer, they can be formulated using lower levels of the copolymer and yet achieve comparable or better results than are found in conventional book binding hot melts. In addition, the use of the specific copolymers described herein permits easy formulation of bookbinding adhesives with Fischer-Tropsch waxes whereas use of Fischer-Tropsch wax with heretofor available block copolymers resulted in unacceptable brittleness and a tendency toward significant stress cracking. These Fischer-Tropsch waxes have long been recognized for their high softening point and faster set but were seldom, if ever, used in rubber based book binding adhesives since the resultant adhesive compositions would crack under stress. The problems consequent with cracking under stress have also necessitated formulation of book binding adhesives using higher amounts of the more costly copolymer vis-a-vis the tackifying resins. Surprisingly, when hot melt adhesives suitable for book binding are formulated with the block copolymers described herein, no stress cracking is observed in compositions formulated with equal amounts of the copolymer and resin component.

The block copolymers described herein may also be used to formulate hot melt adhesive compositions for use in other packaging and structural applications.

The block copolymers useful herein are comprised of styrene and butadiene blocks arranged in a substantially radial configuration and contain 35%, and generally less than about 50% by weight of the styrene moiety. Of greater significance however, the copolymers selected should exhibit a modulus at 300% elongation of at least about 4.5 MPa and a solution viscosity less than about 1000 cps (25% in toluene at 23° C. using a Brookfield viscometer). These copolymers may be prepared using methods taught, for example, in U.S. Pat. Nos. 3,239,478; 3,427,269; 3,700,633; 3,753,936 and 3,932,327. Alternatively they are available from Shell Chemical Co. under the trademark Kraton DX1122 (37% styrene, modulus of 4.8 MPa, viscosity 670 cps) and from Eni Chem Americas (Agip USA Inc.) as Europrene SOL T 162 L W/I (40% styrene, modulus of 5.0 MPa, viscosity 750 cps) or SOl T 162 LW/2 (40% styrene, modulus of 4.6 MPa, viscosity 640 cps). While the optimum amounts of the copolymer used in the adhesive will vary depending on the end use application, the copolymer will generally be present in the adhesive formulation at levels of about 10 to 40% by weight, preferably 15 to 40% by weight.

The tackifying resins useful in the adhesive compositions can be hydrocarbon resins, hydrogenated hydrocarbons, synthetic polyterpenes, rosin esters, natural polyterpenes, and the like. More particularly, the useful tackifying resins include any compatible resins or mixtures thereof such as (1) natural and modified rosins such, for example, as gum rosin, wood rosin, tall oil rosin, distilled rosin, hydrogenated rosin, dimerized rosin, and polymerized rosin; (2) glycerol and pentaerythritol esters of natural and modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, e.g. styrene/terpene and alpha methyl styrene/terpene; (4) polyterpene resins having a softening point, as determined by ASTM method E28-58T, of from about 80° to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof such, for example, as the resin product resulting from the condensation, in an acidic medium, of a bicyclic terpene and a phenol; (6) aliphatic petroleum hydrocarbon resins having a Ball and Ring softening point of from about 70° to 135° C.; the latter resins resulting from the polymerization of monomers consisting of primarily of olefins and diolefins; also included are the hydrogenated aliphatic petroleum hydrocarbon resins; (7) aromatic petroleum hydrocarbon resins and the hydrogenated derivatives thereof; and (8) alicyclic petroleum hydrocarbon resins and the hydrogenated derivatives thereof. Mixtures of two or more of the above described tackifying resins may be required for some formulations. The tackifier is generally used in amounts of 20 to 65% by weight.

The remainder (up to about 60% by weight) of the hot melt adhesive comprises wax diluents. Suitable waxes are the "petroleum derived waxes" which include both paraffin and microcrystalline waxes having melting points within the range of 130°–225° F. as well as synthetic waxes such as polyethylene and Fischer-Tropsch waxes which may be present, in addition to the paraffin wax, in levels of up to about 5% by weight.

Among the applicable stabilizers or antioxidants which may be included herein are high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency and, correspondingly, its reactivity; this steric hindrance thus providing the phenolic compound with its stabilizing properties. Representative hindered phenols include: 1,3,5-trimethyl 2,4,6-tris (3,5-di-tert-butyl-4-hydroxybenzyl)benzene; pentaerythrityl tetrakis-3(3,5-di-tert-butyl-4-hydroxyphenyl)-propionate; n-octadecyl-3,5-di-tert-butyl-4-hydroxyphenol)-propionate; 4,4'-methylenebis (2,6-tert-butylphenol); 4,4'-thiobis (6-tert-butyl-o-cresol); 2,6-di-tert-butylphenol; 6-(4-hydroxyphenoxy)-2,4-bis(n-octyl-thio)-1,3,5-triazine; di-n-octadecyl 3,5-di-tert-butyl-4-hydroxy-benzylphosphonate; 2-(n-octylthio)ethyl 3,5-di-tert-butyl-4-hydroxy-benzoate; and sorbitol hexa[3-(3,5-di-tert-butyl-4-hydroxyphenyl)-propionate]. The stabilizer is present in levels of 0.1 to 4% by weight.

Optional additives may be incorporated into the hot melt compositions in order to modify certain properties thereof. Among these additives may be included colorants such as titanium dioxide; and fillers such as talc and clay, etc.

These hot melt adhesive compositions may be formulated using techniques known in the art. An exemplary procedure involves placing approximately 40% of the total tackifying resin concentration with all the wax and stabilizers in a jacketed mixing kettle, preferably in a jacketed heavy duty mixer, which is equipped with rotors and thereupon raising the temperature to a range of from about 250° to 350° F., the precise temperature utilized depending on the melting point of the particular tackifying resins. When the resin has melted, stirring is initiated and the block polymer is added. Mixing and heating are continued until a smooth, homogeneous mass is obtained whereupon the remainder of the tackifying resin is thoroughly and uniformly admixed therewith. The resultant hot melt adhesives are generally produced in slat form and packaged in boxes.

The adhesives disclosed herein may be employed to bind a plurality of sheets in a wide range of bookbinding operations. Thus, they may be used in the binding of hard or soft bound books using one or two-shot (i.e., primed or unprimed) perfect binding or burst binding techniques. The adhesives may also be used for "gluing-off" sewn books.

In addition to being useful as a bookbinding adhesive, the toughened adhesives described herein may also be effectively utilized in a variety of packaging and carton sealing applications.

In the following illustrative examples all parts are given by weight and all temperatures in degrees Celsius unless otherwise noted.

EXAMPLE I

In preparing the following samples, a heavy duty mixer which had been heater to 150° C. and which was equipped with a stirring paddle was charged with 40% of the tackifying resin, all the antioxidants and the wax. After melting of the resins and wax, stirring was then initiated whereupon the block copolymer was added slowly. Heating and stirring were continued until a homogeneous mass was obtained whereupon the remainder of the tackifying resin was admixed therewith. The molten mixture was then cast on a chilled belt to solidify and package.

Sample A was prepared using 35 parts Kraton D1122X, 35 parts Escorez 7312 (a petroleum hydrocarbon resin from Exxon Chemicals), 25 parts paraffin wax and 1-2 parts antioxidant. Kraton D1122X is a styrene butadiene copolymer available from Shell Chemical containing 37% styrene and having a modulus of 4.8 MPa and a solution viscosity of 670 cps.

Sample B was prepared as sample A but substituting Europrene Sol T162 LW/1 for the Kraton and using 30 parts wax. Sol T 162 LW/1 is a styrene butadiene block copolymer from Eni Chem Americas containing 40% styrene and having a modulus of 5.0 MPa and a solution viscosity of 750 cps.

Sample C (comparative) was prepared as sample B but substituting Europrene Sol T 168, a styrene butadiene block copolymer containing 43% styrene and having a modulus of 2.2 MPa and a Brookfield viscosity of 1000 cps.

The samples prepared above were tested using the following procedures:

Viscosity measurements were determined using a Brookfield viscometer (Spindle 27) at 350° F.

Film Cold Crack—The molten mass was cast, by means of a heated Bird applicator, onto a polytetrafluorethylene-coated steel sheet yielding a film having a dry film thickness of 20 mils. After cooling, the film specimen was stripped from the plate and cut into ½×2 inch test specimens. A representative specimen was then placed in a temperature controlled, carbon dioxide cooled cabinet for a period of 5 minutes whereupon it was immediately flexed at a 180° angle. Where the specimen did not crack as a result of this procedure, a second identical specimen was placed in the cabinet at a lower temperature and the flexing procedure repeated. The temperature at which the specimen eventually cracked was thus viewed as its cold crack or "low temperature flexibility" value. Thus, as the latter value is decreased, there is a corresponding increase in the flexibility and stability which can be expected upon exposing these films and the books bound therewith to low temperature conditions. Two values are recorded, the lower being the value at which the cracking was observed, the higher being the closest value at which cracking did not occur.

Tensile—The tensile strength of a hot melt adhesive is determined on films cast from the hot melts according to Test Method A of ASTM procedure D 882-61T utilizing an Instron Tensile Tester, the films having been prepared according to the method set forth in the above described Film Cold Crack Test. The force required to start to stretch the specimen is recorded as the "tensile yield", the force required to break the specimen as "tensile break". This procedure also provides a measurement of % elongation, which is the percentage stretch of the hot melt film at the point of rupture in obtaining the ultimate tensile strength.

The results of the testing are shown in Table I.

TABLE I

|  | Sample A | Sample B | Sample C |
| --- | --- | --- | --- |
| Viscosity (cps) | 5,875 | 5,500 | 5,690 |
| Tensile Yield (MPa) | 3.3 | 3.7 | 3.5 |
| Tensile Break (MPa) | 11.3 | 13.4 | 7.0 |
| Elongation | 1,730 | 1,615 | 1,665 |
| Film Cold Crack | −30, −25° F. | −30, −25° F. | −25, −20° F. |

The above results show that Samples A and B containing the copolymers described herein provided properties superior to those achieved with the current commercially superior utilized block copolymers. Note, in particular, the improved Tensile Break and Cold Crack properties.

EXAMPLE II

The following example illustrates the use of varying amounts of the raw materials in adhesive compositions of the invention and also provides a comparison with Stereon 840A, a commercially available styrene butadiene block copolymer containing 43% styrene and having a modulus of 2.4 MPa and a viscosity of 650 cps.

Sample D was prepared by repeating the procedure of Example I using 37.5 parts Kraton D1122X, 37.5 parts Escorez 7312, 26.0 parts paraffin wax and 1.2 parts stabilizer.

Sample E was prepared as D but using Sol T162 LW/1 while Sample F was the comparative example which contained Stereon 840A.

The results of the testing are shown in Table II.

TABLE II

|  | Sample D | Sample E | Sample F |
| --- | --- | --- | --- |
| Viscosity | 6,375 | 6,000 | 5,565 |
| Tensile Yield (MPa) | 3.2 | 3.5 | 3.1 |
| Tensile Break (MPa) | 11.8 | 11.9 | 5.3 |
| Elongation % | 1,725 | 1,710 | 1,940 |
| Cold Crack | −35, −30° F. | −30, −25° F. | −30, −25° F. |

The results presented above show that, despite the similarity between the Stereon 840A and the other copolymers with respect to chemical composition, toughened hot melt adhesive compositions of the invention are superior than those prepared using the Stereon copolymer. In particular, note that there is over a 100% increase in tensile break.

EXAMPLE III

The procedure of Example I was again repeated to compare the performance of adhesives formulated with Kraton D1122X with one formulated with Kraton 1102, a linear styrene-butadiene block copolymer containing 28% styrene, having a modulus of 2.76 MPa and a solution viscosity of 1200 cps (at 77° F. in a 25% toluene solution).

Sample G was formulated using 33.7 parts Kraton D1122X, 38.6 parts Escorez 7312, 27.7 parts paraffin wax and 1.2 parts stabilizer. Sample H contained 33.7 parts Kraton 1102, 38.6 parts Escorez 7312, 29.7 parts paraffin wax and 1.2 parts stabilizer.

The results of the testing are shown in Table III.

TABLE III

|  | Sample G | Sample H |
| --- | --- | --- |
| Viscosity | 4,000 | 6,125 |
| Tensile Yield (MPa) | 3.4 | 2.3 |
| Tensile Break (MPa) | 8.5 | 4.0 |
| Elongation | 1,465 | 1,440 |
| Film Cold Crack | −25, −20° F. | −25, −20° F. |

The results presented above again show the superiority of the adhesive compositions of the present invention. Again, note the over 100% increase in tensile break.

EXAMPLE IV

This example illustrates the use of different types of tackifing resins in the adhesive compositions of the invention.

Samples J, K and L were prepared using 37.5 parts Kraton DX1122X, 35.0 parts tackifier, 27.5 parts wax and 1.2, 1.0 and 1.0 parts, respectively, of stabilizer. In Sample J, Escorez 7312 (an aromatic resin from Exxon) was used; Sample J used a pentaerythritol ester of rosin and Sample K used Nirez M 105 (an aromatic modified terpene resin from Reichold Chemical).

The results of testing are shown in Table IV.

TABLE IV

|  | Sample H | Sample J | Sample K |
| --- | --- | --- | --- |
| Viscosity | 6,190 | 5,100 | 5,075 |
| Tensile Yield (MPa) | 3.0 | 0.8 | 0.4 |
| Tensile Break (MPa) | 12.5 | 8.7 | 8.5 |
| Elongation % | 1,835 | 1,800 | 1,825 |
| Film Cold Crack | −35, −30° F. | < −40° F. | < −40° F. |

The above results show the superior properties obtained using any of the tackifiers described above.

EXAMPLE V

This example illustrates the unsuitability of a product marketed by Eni Chem Americas as Sol T162 (styrene content 40%; modulus 5.0 MPa; viscosity 1290 cps).

These hot melt adhesive compositions were prepared as in Example I using a ratio of 43.75 parts copolymer to 56.25 parts aromatic tackifying resin and sufficient wax to bring the viscosity of the products to between 6000 and 8000 cps at 350° F. Sample L contained Sol T162 LW/1; Sample M, Kraton D1122; and Sample N, the comparative Sol T 162.

The compositions were tested for tensile strength as described previously (results represent the tensile break value). In addition, they were tested for adhesion to primed book edges as favorite in many industrial book binding operations. In this test, the hot melt adhesive was applied on top of a dried film of a conventional ethylene vinyl acetate emulsion primer, allowed to solidify, conditioned for 16 hours at 72° F., 50% relative humidity and peeled off using an Instron Test machine. The test results are shown below:

TABLE V

|  | Sample L | Sample M | Sample N |
| --- | --- | --- | --- |
| Tensile Strength (MPa) | 11.4 | 9.4 | 9.4 |
| Adhesion (KN/m) | 16.1 | 19.8 | 2.9 |

As the results show, the hot melt adhesive composition prepared from the Sol T162 does not exhibit adequate adhesion to be used in applications requiring the toughned hot melt compositions of the present invention.

EXAMPLE VI

Adhesives similar to those described in Examples I–V were prepared and tested for the additional properties of flexibility required in hot melt adhesive compositions used in book binding. In these cases, relatively heavy coatings of the adhesive are applied to the bound edges of the book block and a paper cover affixed thereto. Due to the heavy coating weight and the insulating properties of the book block, cooling proceeds rather slowly and a specific crystalline type structure is formed. This structure is simulated by forming samples of the adhesive in disks approximately 4 mm thick and allowing them to solidify at room temperature. After aging for 24 hours, the samples are placed in a clamp held at approximately 180° angle for 24 hours. The degree of flexibility of the adhesive is noted by the presence or absence of stress cracks or fractures in the sample after removal of the clamps and blending the specimen back flat.

In the preparation of samples for testing herein, adhesives were prepared from the rubbery copolymer, tackifier resins and wax using 100 parts of the copolymer/resin mixture and varying parts paraffin wax. Since the wax content is a diluent, only the ratio of copolymer to resins will be discussed in the examples.

In the first series of tests, the use of Fischer-Tropsch waxes in the adhesives was evaluated. A conventionally employed adhesive containing 53.6 SOL T 168, 46.4 parts resin and paraffin wax was tested. No stress cracks were observed. The same formulation was prepared utilizing Fischer-Tropsch wax in place of 2.5 parts of the commercially employed paraffin wax. Severe stress cracking occurred. The two samples described previously were prepared but using Kraton DX 1122X. No stress cracks were seen in either sample thus demonstrating the ability to utilize the desirable Fischer-Tropsch wax in book binding formulations.

A second series of tests were performed in order to show the ability to use lower levels of the block copolymer in the adhesive formulations without loss of desired properties.

Adhesive samples were prepared using commercially employed formulations with Sol T168 in copolymer/resin ratio of 48.3/51.7;50/50 and 53.2/46.8. Only the latter sample containing 53.2 parts SOL T 168 copolymer passed the stress crack test. In contrast, similar adhesives were formulated using 50/50 ratios of Kraton 1122X to resin and Sol T162LW/1 to resin. No cracking was observed. As a further comparison, another sample was prepared with a 50/50 ratio of Stereon 840A to resin. The latter sample failed the stress crack test.

Two more samples were prepared and contrasted for stress cracks. The samples were prepared using the lower 46.6 to 53.4 ratios of Kraton 1102 and Kraton D1122X, respectively. Only the sample prepared with the Kraton D 1122X passed the stress crack test.

EXAMPLE VII

The following example illustrates the preparation of a hot melt adhesive composition suitable for packaging applications.

A hot melt adhesive was prepared using the basic procedure of Example I with 25 parts Kraton D1122X, 25 parts of a terpene phenolic resin, 50 parts paraffin wax and 1 part stabilizer.

When tested as described above, the adhesive had a viscosity of 375 cps at 350° F.; 875 cps at 300° F.; a tensile yield of 3.2 MPa; a tensile break of 3.5 MPa; an elongation of 860% and a film cold crack of −20°, −15° F.

The adhesive was also subjected to Peel/Shear testing such as is conventionally required in the packaging industry. Peel Temperature Test: A bead of test adhesive approximately ⅛ inch in diameter is applied at 350° F. with a glass rod onto 60 pound/ream kraft paper. A second sheet of the same paper is placed in direct alignment with the first sheet within 2 seconds and pressed thereto to form a kraft-to-kraft bond.

The bonded sheets are then cut perpendicular to the adhesive line into 1 inch wide strips. Duplicate bonded specimens are placed in an oven with one free end of the specimen attached to a fixed support and a 100 gram load suspended from the other free end. The oven temperature is then increased in 10° F. increments at 15 minute intervals. The temperature at which bond delamination occurred is specified as the peel temperature.

Shear Temperature Test: Samples are prepared as in peel temperature test but opposite ends of the bonded specimen are suspended and weighted to stress the bond in a shear mode. Temperature of oven is increased as in peel test until failure.

The adhesive gave a peel value of 150° F. and a shear value of 170° F.

It will be apparent that various changes and modifications may be made in the embodiments of the invention described above, without departing from the scope of the invention, as defined in the appended claims, and it is therefore intended that all matter contained in the foregoing description shall be interpreted as illustrative only and not as limitative of the invention.

We claim:

1. A toughened hot melt adhesive composition consisting essentially of:
   (a) 10 to 40% by weight of a substantially radial styrene-butadiene block copolymer having a styrene content of at least 35% by weight, a modulus at 300% elongation of at least 4.5 MPa and a solution viscosity less than about 1000 cps;
   (b) 20 to 65% by weight of a compatible tackifying resin;
   (c) 0.1 to 4% by weight of a stabilizer; and
   (d) the remainder of the composition, to total 100%, comprising at least one waxy diluent.

2. The adhesive of claim 1 wherein the styrene butadiene block copolymer contains 37 to 40% styrene, has a modulus at 300% elongation of 4.6 to 5 MPa and a solution viscosity of 640 to 750 cps.

3. The adhesive of claim 1 wherein the tackifying resin is selected from the group consisting of natural and modified rosins; glycerol and pentaerythritol esters of natural and modified rosins; copolymers and terpolymers of natural terpenes; polyterpene resins having a softening point, as determined by ASTM method E28-58T, of from about 80° to 150° C.; phenolic modified terpene resins and hydrogenated derivatives thereof; aliphatic petroleum hydrocarbon resins having a Ball and Ring softening point of from about 70° to 135° C.; aromatic petroleum hydrocarbon resins and the hydrogenated derivatives thereof; and alicyclic petroleum hydrocarbon resins and the hydrogenated derivatives thereof.

4. The adhesive of claim 1 wherein the wax is a paraffin or microcrystalline wax.

5. The adhesive of claim 1 wherein there is additionally present up to 5% by weight of a synthetic wax.

6. In a process for the binding of books wherein a hot melt adhesive is applied to a plurality of sheets at the backbone of the book, the improvement which comprises utilizing as the hot melt adhesive a composition consisting essentially of:
   (a) 10 to 40% by weight of a substantially radial styrene-butadiene block copolymer having a styrene content of at least 35% by weight, a modulus at 300% elongation of at least 4.5 MPa and a solution viscosity less than about 1000 cps;

(b) 20 to 65% by weight of a compatible tackifying resin;

(c) 0.1 to 4% by weight of a stabilizer; and (d) the remainder of the composition, total 100%, comprising at least one waxy diluent.

7. The process of claim 6 wherein there is additionally present in the adhesive composition up to 5% by weight of a synthetic wax.

8. The process of claim 6 wherein the backbone of the book has been primed prior to application of the hot melt adhesive.

9. A book containing a plurality of sheets therein which are bound to one another at the backbone thereof by means of a dried residue of a hot melt adhesive composition of adhesive consisting essentially of:

(a) 10 to 40% by weight of a substantially radial styrene-butadiene block copolymer having a styrene content of at least 35% by weight, a modulus at 300% elongation of at least 4.5 MPa and a solution viscosity less than about 1000 cps;

(b) 20 to 65% by weight of a compatible tackifying resin;

(c) 0.1 to 4% by weight of a stabilizer; and (d) the remainder of the composition, to total 100%, comprising at least one waxy diluent.

10. The book of claim 9 wherein there is additionally present in the adhesive composition up to 5% by weight of a synthetic wax.

* * * * *